United States Patent
Brooks

[11] 3,871,021
[45] Mar. 11, 1975

[54] 3.58 MEGACYCLE BANDPASS AND OSCILLATOR DETECTOR FOR A COLOR TELEVISION

[76] Inventor: Clennie Cecil Brooks, 412 Edgewood Ave., Rome, Ga. 30161

[22] Filed: June 15, 1973

[21] Appl. No.: 353,309

[52] U.S. Cl. .................................. 358/10, 325/363
[51] Int. Cl. ............................................. H04n 9/62
[58] Field of Search........ 178/5.4 R, 5.4 TE; 358/10; 325/363

[56] References Cited
UNITED STATES PATENTS

| | | | |
|---|---|---|---|
| 2,395,850 | 3/1946 | Colman | 325/363 |
| 2,732,491 | 1/1956 | Jeannot | 325/363 |
| 3,641,439 | 2/1972 | Aslan | 325/363 |
| 3,783,448 | 1/1974 | Brodwin | 325/363 |

Primary Examiner—Richard Murray

[57] ABSTRACT

The invention's purpose is to quickly determine what and to quickly locate where the failure is in a color television receiver, when black and white pictures appear on the screen instead of intended color pictures.

1 Claim, 1 Drawing Figure

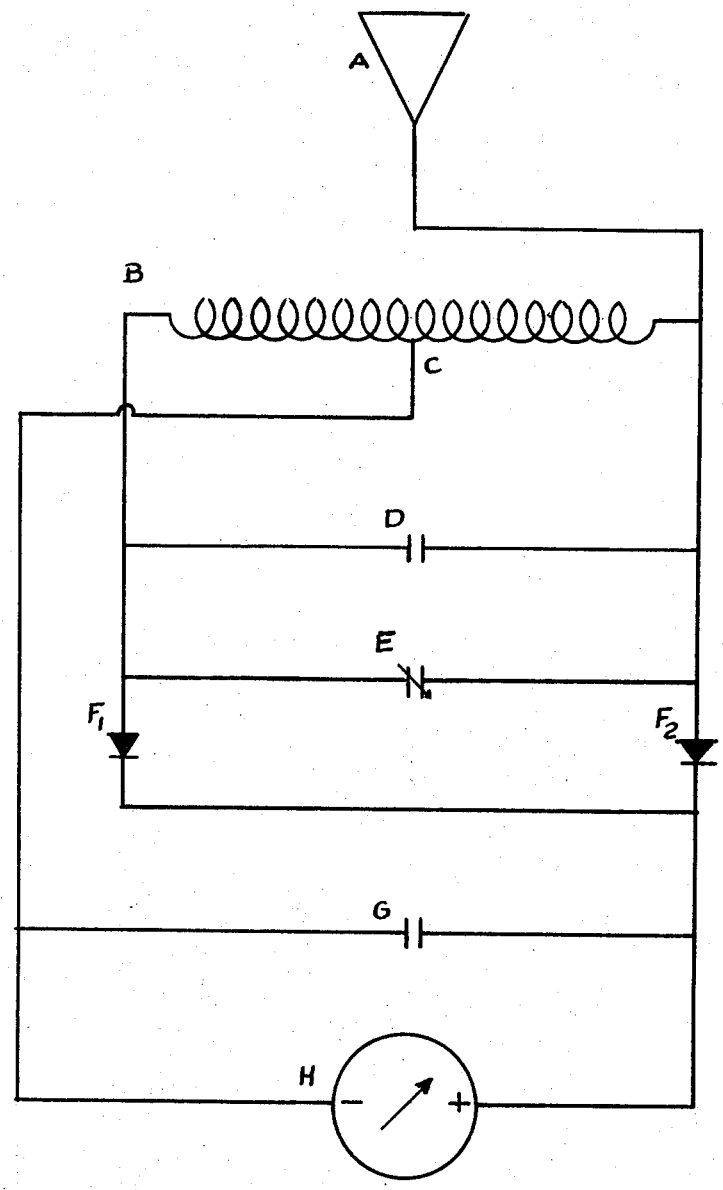

3.58 MEGACYCLE BANDPASS AND OSCILLATOR DETECTOR FOR A COLOR TELEVISION

Brief Summary

The above-named invention is designed for the purpose of trouble shooting the color sections of color television, both tube type, solid state type and a combination of both tube and solid state. By utilizing the invention as designed much time and effort may be saved when trying to find trouble in the color sections of color television sets. The basic parts of the color receiver can be quickly and easily checked to eliminate trial and error procedures and likely chasis removal. The invention is a refined electronic instrument with economical and simple construction. By utilizing the antenna built on the invention as a defective device, the part of the color section in question when exposed will electronically deflect a meter to indicate if that particular part is good, if no deflection occurs, that particular part is bad.

DETAILED DESCRIPTION

The loop and antenna is made of heat resistant insulated 20 guage wire. The loop is given two turns and being 1⅜ inches in diameter. This measurement will fit the campactron tube that is frequently used in tube type color television receivers. It is through this loop that the signal is picked up. The extended 20 guage heat resistant insulated wire is twisted for a length of approximately 9 inches from the loop and connected to the end of the resonant curcuit in the main body of the instrument. The twisted effect is to make the antenna flexible. The extended factor is to get the loop into tight or hard to get to places. The insulated factor is used because of the heat build-up inside the color sets. A coil is used in order to resonate the tune circuit at the selected frequency. The flexible antenna is attached to one side of the coil which is made of 24 guage magnet wire and having 34 turns. The coil is tapped in the center (17 turns from each end) for greater sensitivity. From the tap point the coil is connected to a 0.001 UF capacitor.

Each end of the coil is connected to a 120 uuf mica capacitor causing them to be in parallel. The 120 uuf mica capacitor and coil is used because it is near resonant to the 3.58 M.C. frequency which is the approximate frequency common to all color sections of color television receivers. A 1 –7 uuf adjustable capacitor is then placed in parallel with the coil and the 120 uuf mica capacitor. This 1 –7 uuf adjustable capacitor is used to adjust the circuit that may be a fraction above or below the 3.58 mc level on any given color television receivers. Two IN34 diodes are then connected to each end of the resonant circuit. These diodes have little resistance in the circuit therefore the signal can be converted to D.C. amperes easier and a greater sensitivity is obtained. The circuit is then connected to one side of a 0.001 uf capacitor. The other side of the 0.001 uf capacitor is connected to the coil at the point where it was tapped (as mentioned earlier). The purpose for the 0.001 uf capacitor is to filter any A.C. signal that might offset the meter which is in parallel to the 0.001 uf capacitor. The meter which is set in parallel to the 0.001 uf capacitor is a 0 –50 scale D.C. Microamperes meter. This meter is used to show signal detection. For the case to enclose the instrument, preferably an aluminum case is used. The meter is preferably attached at one end and the antenna at the other end.

INSTRUCTIONS FOR USE OF: 3.58 M.C. BANDPASS AND OSCILLATOR FOR COLOR TELEVISION RECEIVERS

By using the invention correctly it will determine if the 3.58 Oscillator tube is bad; if the Bandpass Amplifier tube is bad; if the Burst Amplifier Tube is bad on the tube type color television receivers. It will determine if the transistors which replaces these three sections in solid state color television receiver is bad. These three sections are otherwise very difficult to check.

On tube type color television receivers, the Oscillator tube, bandpass amplifier tube, and the burst amplifier tube can be checked by simply placing the loop over the top part of that respective tube. The meter will deflect if the tube is good.

On solid state color television receivers it is necessary to expose the color coils to the loop since there are no tubes and transistors will not register signals. By checking the coils for each respective section (hover the loop over the coil) the bad section will be detected. The 3.58 M.C. crystal may be spot checked (by hovering the loop over the crystal) before exposing the coils to determine if the oscillator transistor is working. On solid state circuits it is recommended to have a color generator with rainbow pattern for better detection.

By using this invention and the above quick checks, the technician can very easily eliminate the time and trouble of pulling the entire color television receiver chasis.

The three above named sections; Bandpass Amplifier Tube, Burst Amplifier Tube, Oscillator Tube or their respective replacements in Solid State Sets; can be checked without their removal. This ability many times pinpoints the exact trouble in a matter of minutes, and enables the technician to restore color to the color receiver.

EXPLAINATION OF DRAWING

A. This antenna has a double loop of heat resistant wire, being insulated and having a diameter of approx. 1⅜ inches so as to fit over most vacuum tubes used in tube type color television sets.

B. The coil, having 34 turns and centered 17 turns from each end, is located inside the instrument.

C. The coil is tapped at this point and connected to the meter H.

D. A 120 uuf mica capacitor is placed in parallel with the coil B.

E. A 1 –7 uuf scale adjustable capacitor is placed in parallel with the coil B. and the 120 uuf mica capacitor D.

$F_1$ These are 1N34 diodes and are connected to each end of the resonate circuit to convert AC to DC current.

G. This 0.001 uf capacitor is placed at this point to filter any AC current that would deflect the meter H. It is also placed in parallel with the meter H.

H. A 0 –50 scale DC micro amperes meter is used to show signal detection. It is in papallel to the capacitor G.

What is claimed is:

1. An apparatus for testing in a color television receiver which apparatus requires no power supply comprising;

a sensing means for radiated waves, a resonant circuit means comprising an inductance means and capacitance means connected to said sensing means, a rectifiying means connected to the resonant circuit, a metering means connecting the rectifying means and inductance means, said apparatus senses the operability of a color oscillator in said receiver when said sensing means is closely associated with said oscillator, said sensing means comprising a loop connected to said resonant circuit.

* * * * *